Aug. 18, 1959  R. L. ARNOLD  2,899,776
MULTI-PURPOSE IMPLEMENT FOR CULTIVATION INCLUDING FLAMING
Filed Aug. 4, 1958  3 Sheets-Sheet 1
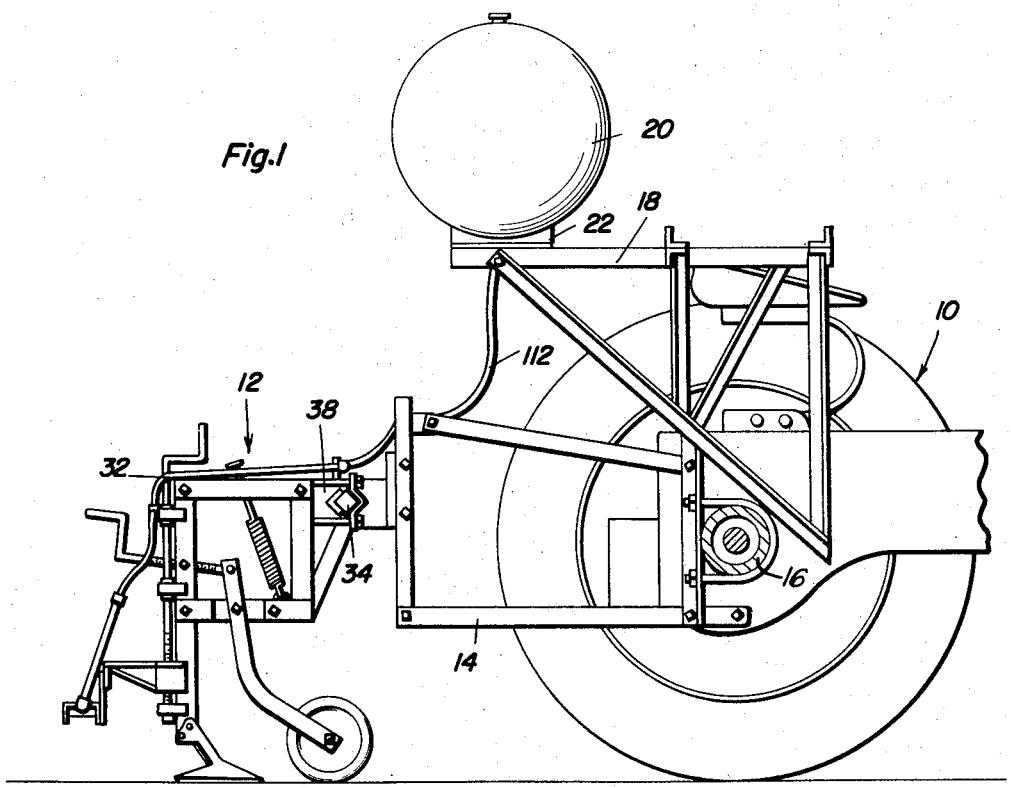
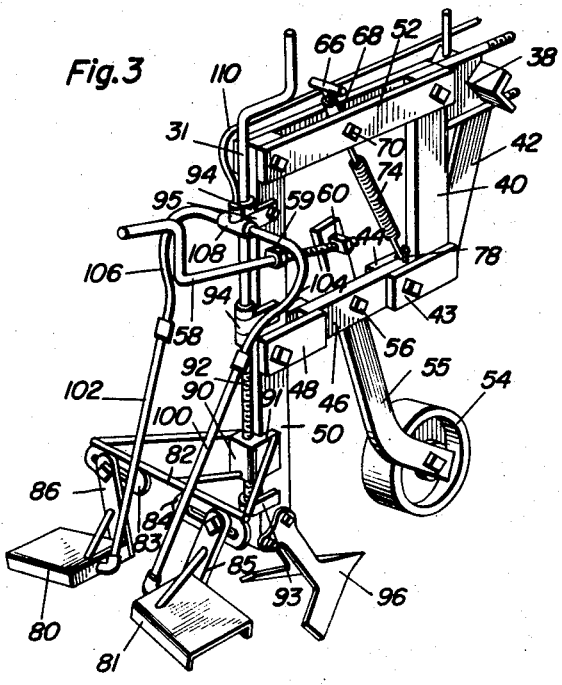
R L Arnold
INVENTOR.

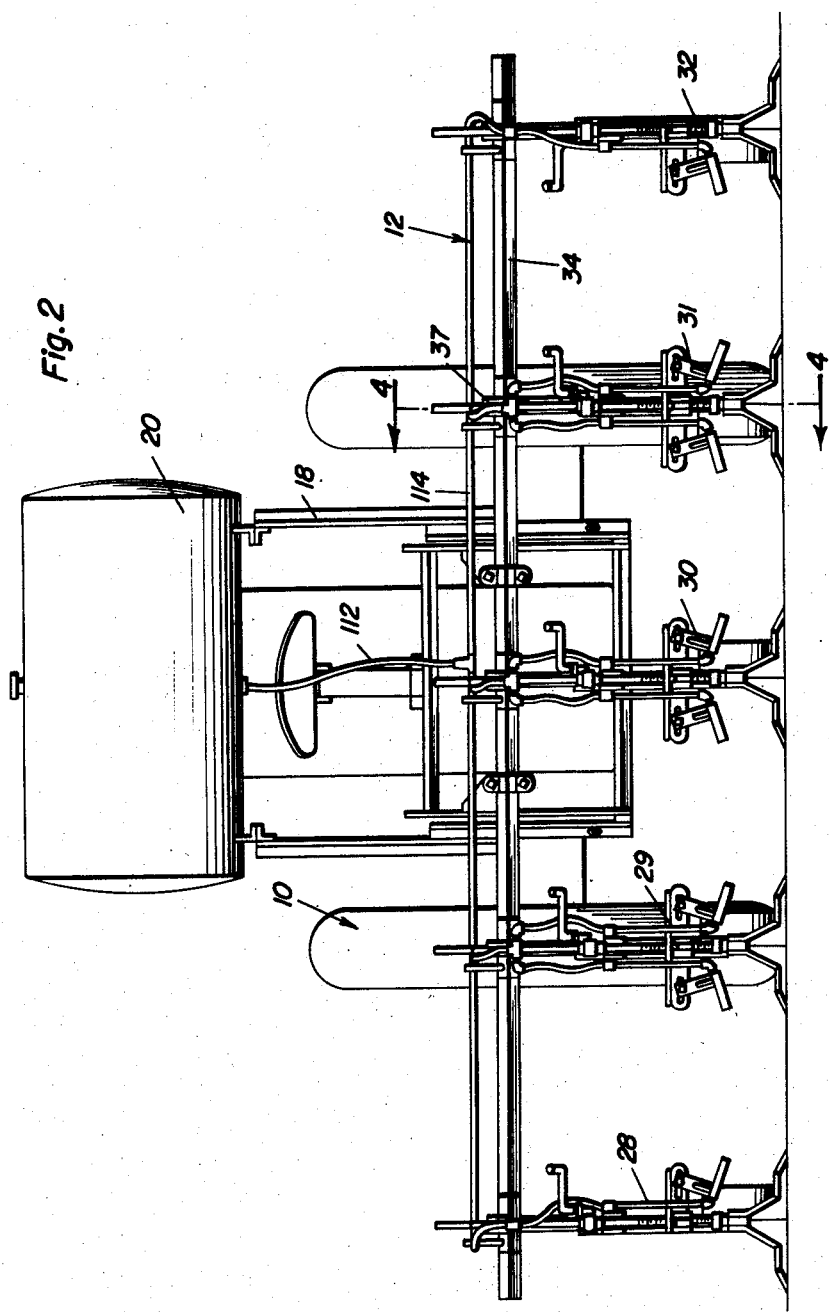

Aug. 18, 1959 R. L. ARNOLD 2,899,776
MULTI-PURPOSE IMPLEMENT FOR CULTIVATION INCLUDING FLAMING
Filed Aug. 4, 1958 3 Sheets-Sheet 3
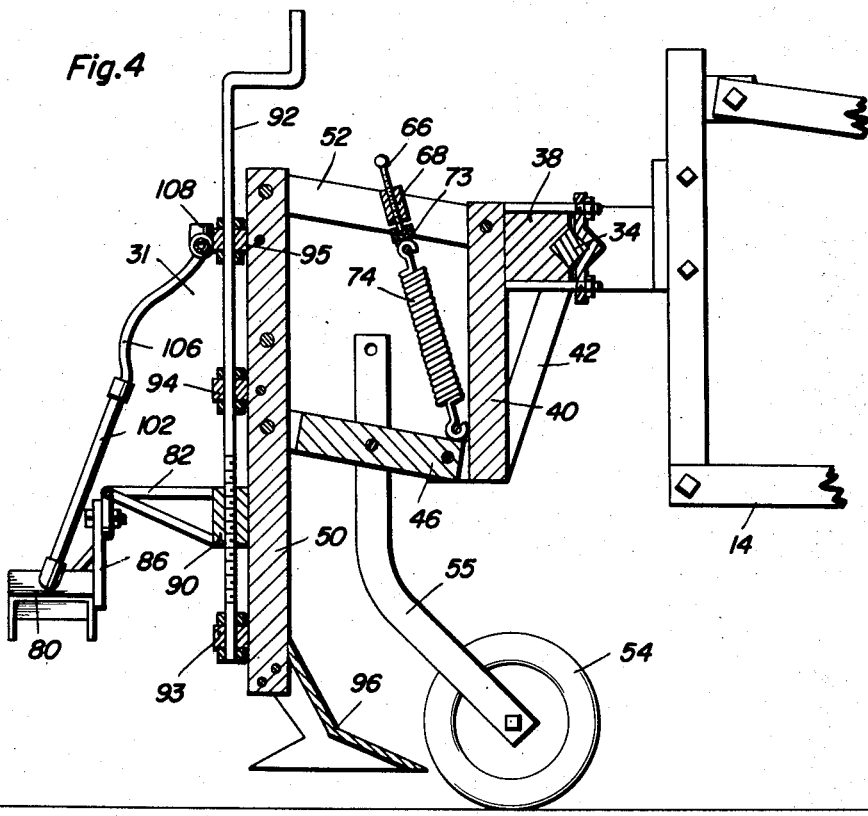
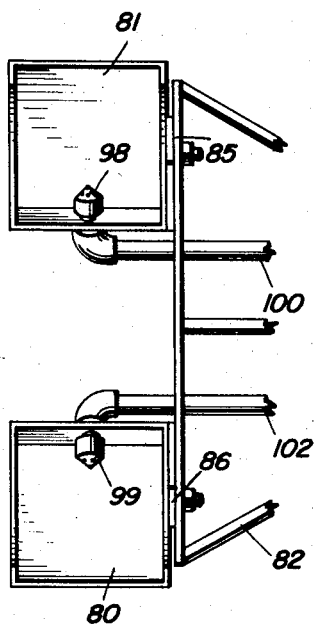
R L Arnold
INVENTOR.

United States Patent Office 2,899,776
Patented Aug. 18, 1959

2,899,776

MULTI-PURPOSE IMPLEMENT FOR CULTIVATION INCLUDING FLAMING

R L Arnold, Tunica, Miss.

Application August 4, 1958, Serial No. 753,004

7 Claims. (Cl. 47—1)

This invention relates to a multi-purpose implement.

In order to reduce the cost of cotton and corn production by eliminating the expensive, scarce, hand labor that is involved in controlling grass and weeds in these crops, this invention has been designed and developed as a multiple purpose, tractor mounted implement to accomplish the control of grass and weeds more efficiently, effectively, economically and simpler with a greater degree of safety and precision than has heretofore been accomplished.

The implement consists of units, one normally used per crop row, and may be either mounted or fixed to the square tool bar at the back of the tractor which is cut to the desired width of rows. A 14 foot length in most cases would be sufficient for four rows of a rear mounted unit. These units or gangs can be attached to the front of the tractor by using a longer bar in front of the bolster of two bars, or on each side of the tractor. For simplicity, only the rear tool bar mounted units are explicitly discussed in the ensuing description.

The important features of this invention are that it is primarily and basically made for mechanical tractor farming and as a tractor mounted, multiple machine, rather than a horse drawn implement adapted to a tractor. The implement is so designed that it has high clearance for long periods of cultivation of tall crops without plant damage. The design is clean and eliminates protrusions and bulky unnecessary parts that tear limbs and fruit from crops such as cotton, soya beans and others and therefore this invention increases the yield by refraining from destroying part of the crop during the weed controlling procedure.

The construction of the implement is such that it may be made heavy duty for economical operation and low cost maintenance in all areas of the country. Heavy coil springs which can be adjusted without any tools, quickly set penetration for all types of soils. Rubber tire gang wheels easily and quickly adjust the depth by turning a hand crank, there further being no tools required for this adjustment.

The invention operates for a weed control by flame cultivation. The flame cultivators can be quickly attached and detached and the flame burners are easily and quickly and safely adjusted in the field even when hot by simply turning a hand crank remote from the burner proper. The operator can stand three feet away from the burners and adjust them without any danger of being burned, and this is very important when considering the difficulty of adjusting commercially available burners.

The units are easily mounted on a tool bar that a farmer might already own. The tool bar, if not available, is inexpensive and easily attached to a tractor.

The invention although principally useful for the purposes mentioned above, can be used for sweep cultivation, flame cultivation, bedding land, applying liquid fertilizers, insecticides, sub-soiling, knife weeding, cross plow and high clearance cultivations.

Accordingly, an object of the invention is to provide a multi-purpose implement in accordance with the foregoing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational view of an implement constructed in accordance with the invention and showing a typical rear mount thereof on a fragmentary part of a tractor.

Figure 2 is a rear view of the implement and tractor in Figure 1.

Figure 3 is a perspective view of one unit of the implement.

Figure 4 is an enlarged sectional view taken on the line 4—4 of Figure 2.

Figure 5 is a bottom plan view of a typical burner assembly.

In the accompanying drawings there is a tractor 10 on the rear of which multi-purpose implement 12 is connected. The tractor has rear support 14 secured to the axle housing 16. Support 14 is variable in construction depending on the manufacturer's make of tractor that the farmer owns, and the same holds true for the frame 18 that supports fuel tank 20 at an elevation above the units of implement 12. Frame 18 is shown suitably attached to the support 14 and is made of frame members that are welded or rigidly secured together and that have saddle 22 within which tank 20 is rested and held in place, for instance by being welded or by using straps.

The illustration (Figure 2) shows five units 28, 29, 30, 31 and 32. The outboard units 28 and 32 have only inboard burners while the intermediate units 29, 30 and 31 have a pair of burners, one on each side of a plane passed through the longitudinal center line of the units.

Each unit is attached to the square tool bar 34 that is mounted on support 14 by means of a clamp. Typical clamps 37 and 38 (Figures 2 and 4 respectively) are made of two cap screws, two hex nuts, lock washers and clamp members similar to International Harvester part No. PO19926. Each unit is practically identical and therefore typical unit 31 (Figures 3 and 4) is described in detail. The unit 31 is made of a front beam 40 which is attached to clamp 38. The lower part of the front beam has a brace 42 attaching it to the clamp 38 and also has a pair of parallel plates 43 and 44 between which link 46 is pivoted. Similar plates 48 are attached to link 46, and these are pivoted to standard or rear beam 50 intermediate the upper and lower ends thereof. The top link 52 is made in two parts spaced from each other and pivoted respectively to the upper ends of front beam 40 and the rear beam or standard 50. This forms a parallelogram linkage as the basic structural frame of unit 31.

Rubber tire depth gauge wheel 54 is mounted on a wheel supporting lever 55, the latter connected by pivot 56 to link 46 between the ends of the link. Hand crank 58 is mounted rotationally in support bracket 59 on rear beam 50 but cannot move axially with respect to bracket 59. The hand crank has a threaded outer end passed through the threaded opening in a pivoted bracket 60 carried near the upper end of lever 55. Therefore, when hand crank 58 is rotated, the lever 55 is swung about pivot 56 to control the position of the depth gauge wheel 54.

The standard or rear beam 50 is vertically adjusted by rotating screw 66, the latter being threaded in sleeve 68 located between the two sides or parts of link 52.

and pivoted, for instance by trunnion 70. Swivel connector 73 on screw 66 connects one end of spring 74 to the screw 66, the other end of the spring being attached to the front beam 40 or bracket 43 or 44, by means of hook and eye structure 78 or by other suitable means. Accordingly, the parallelogram frame is adjusted to have the standard or rear beam raised and lowered by rotation of screw 66.

The flame attachment is made of a pair of burners 80 and 81, each in the form of a downwardly opening channel and adjustably attached to rear support bracket 82. The rear support bracket is made of a structural framework of approximately triangular shape and provided with a pair of plates 83 and 84 in which there are slots. Bolt and nut assemblies are connected to support arms 85 and 86, and these are secured to the burners 80 and 81 and adjustably positionable with respect to bracket 82 in that the bolt and nut assemblies may be positioned anywhere in the slots of plates 83 and 84. The bracket 82 has a slide or block 90 with an inwardly opening saddle forming passage 91 embracing the rear edge part of the standard or rear support 50. The members of bracket 82 are welded or otherwise secured to the slide or block 90, and it is threaded to receive the threaded part of the crank 92. The crank extends vertically along the rear edge of rear beam 50 and has its lower end journaled in bracket 93 that is attached to beam 50. An intermediate part of crank 92 is journaled in a bearing 94 also carried by beam 50, while the upper part of the crank has a collar 94 that abuts the upper bearing 95 also carried by rear beam 50. Therefore, when crank 92 is rotated, the slide 90 is raised or lowered depending on the direction of rotation of the crank, and this raises or lowers mounting bracket 82 and correspondingly raises or lowers the adjustably mounted burners 80 and 81.

The burners are preferably set at an angle to the horizontal and vertical reference planes (Figure 3) and they trail an earth working tool 96 which is attached to the lower part of the rear beam or standard 50. Although one type of earth working tool is shown, it is understood that others may be substituted. This same holds true of the burners 80 and 81. Although conventional nozzles 98 and 99 are illustrated (Figure 5) these can be substituted for other types of nozzles or burner heads. Regardless of the type of burner head or nozzle, fuel conductors, as conduits 100 and 102 are attached thereto and to a pair of flexible hoses 104 and 105 which join together at T 108 which is connected to upper bearing 95. Fuel conductive lines, for instance a flexible hose 110 is attachtd to the T and forms a part of a fuel flow conducting system that ultimately connects with tank 20 through a single line 112 and manifold pipe 114.

As indicated previously and shown in Figure 1 and Figure 2, the outboard unit 28 and 29 are the same as the inboard units except for flame cultivation. They have burners at the inboard sides thereof only.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A multi-purpose implement adapted to be attached to a tractor, said implement comprising an essentially vertical front beam, a clamp to attach the front beam to a part of the tractor, a rear beam parallel to said front beam, a pair of links pivoted to said beams and parallel to each other thereby forming an essentially parallelogram frame structure, means for adjusting the rear beam with respect to said front beam and attached to one of said links to effect the adjustment, a depth gauge wheel, means adjustably mounting said depth gauge wheel on one of said links to preserve the adjustment of the rear beam, and means adjustably carried by said rear beam for cultivation, the last mentioned means including at least one burner, a mounting bracket to which said burner is adjustably secured, a slide mounted on said rear beam and fixed to said mounting bracket, manually operable means for adjusting said slide and thereby adjusting said bracket and burner on said rear beam, and fuel delivery means connected with said burner.

2. A multi-purpose implement adapted to be attached to a tractor, said implement comprising an essentially vertical front beam, a clamp to attach the front beam to a part of the tractor, a rear beam parallel to said front beam, a pair of links pivoted to said beams and parallel to each other thereby forming an essentially parallelogram frame structure, means for adjusting the rear beam with respect to said front beam and attached to one of said links to effect the adjustment, a depth gauge wheel, means adjustably mounting said depth gauge wheel on one of said links to preserve the adjustment of the rear beam, means adjustably carried by said rear beam for cultivation, one of said links having a pair of parallel parts spaced from each other, said means for adjusting said rear beam with respect to said front beam including a spring fixed at one end, a screw, means mounting said screw between said parts of said link for adjustment, and means connecting said screw with said spring, flame cultivating means connected adjustably with said rear beam, manual means for adjusting said flame cultivating means, and an earth working tool also carried by said rear beam and located adjacent to said flame cultivating means, said flame cultivating means including a pair of burners, arms secured to said burners, a mounting bracket, a slide to which said mounting bracket is fixed, said mounting bracket having at least one slot, and means adjustably securing said arms in selected positions within said slot.

3. In a multi-purpose implement, a first beam and a second beam, means for moving one of said beams with respect to the other of said beams while maintaining said beams substantially parallel, a clamp attached to the non-movable beam and adapted to connect with a tractor, flame cultivating means attached to the movable beam, said flame cultivating means including at least one burner, a bracket, means securing said burner to said bracket, a manually adjustable screw carried by the movable beam, means connected with said screw and said bracket to move said bracket longitudinally of said movable beam in response to rotation of said screw.

4. In a multi-purpose implement, a first beam and a second beam, means for moving one of said beams with respect to the other of said beams while maintaining said beams substantially parallel, a clamp attached to the non-movable beam and adapted to connect with a tractor, flame cultivating means attached to the movable beam, said flame cultivating means including at least one burner, a bracket, means securing said burner to said bracket, a manually adjustable screw carried by the movable beam, means connected with said screw and said bracket to move said bracket longitudinally of said movable beam in response to rotation of said screw, a tank within which to store fuel for said burner, and a fuel delivery conduit system connected with said tank and said burner.

5. In a multi-purpose implement, a first beam and a second beam, means for moving one of said beams with respect to the other of said beams while maintaining said beams substantially parallel, a clamp attached to the non-movable beam and adapted to connect with a tractor, flame cultivating means attached to the movable beam, said flame cultivating means including at least one burner, a bracket, means securing said burner to said bracket, a manually adjustable screw carried by the movable beam, means connected with said screw and said bracket to move said bracket longitudinally of said movable beam in response to rotation of said screw, said means connecting said beams including a pair of links pivoted to said beams and spaced from each other, a spring connected between the non-movable beam and one of said links and manually adjustable means connected with said spring and the last mentioned link to adjust the tension in said spring and thereby adjust the position of said movable beam with respect to said fixed beam by moving said links and movable beam.

6. In a multi-purpose implement, a first beam and a second beam, means for moving of said beams with respect to the other of said beams while maintaining said beams substantially parallel, a clamp attached to the non-movable beam and adapted to connect with the tractor, flame cultivating means attached to the movable beam, said flame cultivating means including at least one burner, a bracket, means securing said burner to said bracket, a manually adjustable screw carried by the movable beam, means connected with said screw and said bracket to move said bracket longitudinally of said movable beam in response to rotation of said screw, said means connecting said beams including a pair of links pivoted to said beams and spaced from each other, a spring connected between the non-movable beam and one of said links and manually adjustable means connected with said spring and the last mentioned link to adjust the tension in said spring and thereby adjust the position of said movable beam with respect to said fixed beam by moving said links and movable beam, a depth gauge, means adjustably connecting said depth gauge to one of said links, and manually operable means for actuating said depth gauge connecting means.

7. In a multi-purpose implement, a first beam and a second beam, means for moving one of said beams with respect to the other of said beams while maintaining said beams substantially parallel, a clamp attached to the non-movable beam and adapted to connect with the tractor, flame cultivating means attached to the movable beam, said flame cultivating means including at least one burner, a bracket, means securing said burner to said bracket, a manually adjustable screw carried by the movable beam, means connected with said screw and said bracket to move said bracket longitudinally of said movable beam in response to rotation of said screw, a tank within which to store fuel for said burner, and a fuel delivery conduit system connected with said tank and said burner, said burner constructed of a downwardly opening channel, a burner head within said channel so that the flame emanating from said head is baffled by said channel and directed downwardly toward the soil containing weeds, grass and the like.

References Cited in the file of this patent

UNITED STATES PATENTS

| | | |
|---|---|---|
| 2,523,953 | Johnson | Sept. 26, 1950 |
| 2,528,899 | McLemore | Nov. 7, 1950 |

FOREIGN PATENTS

| | | |
|---|---|---|
| 393,751 | Germany | Apr. 7, 1924 |